INVENTOR.
THEODORE L. KOZUL

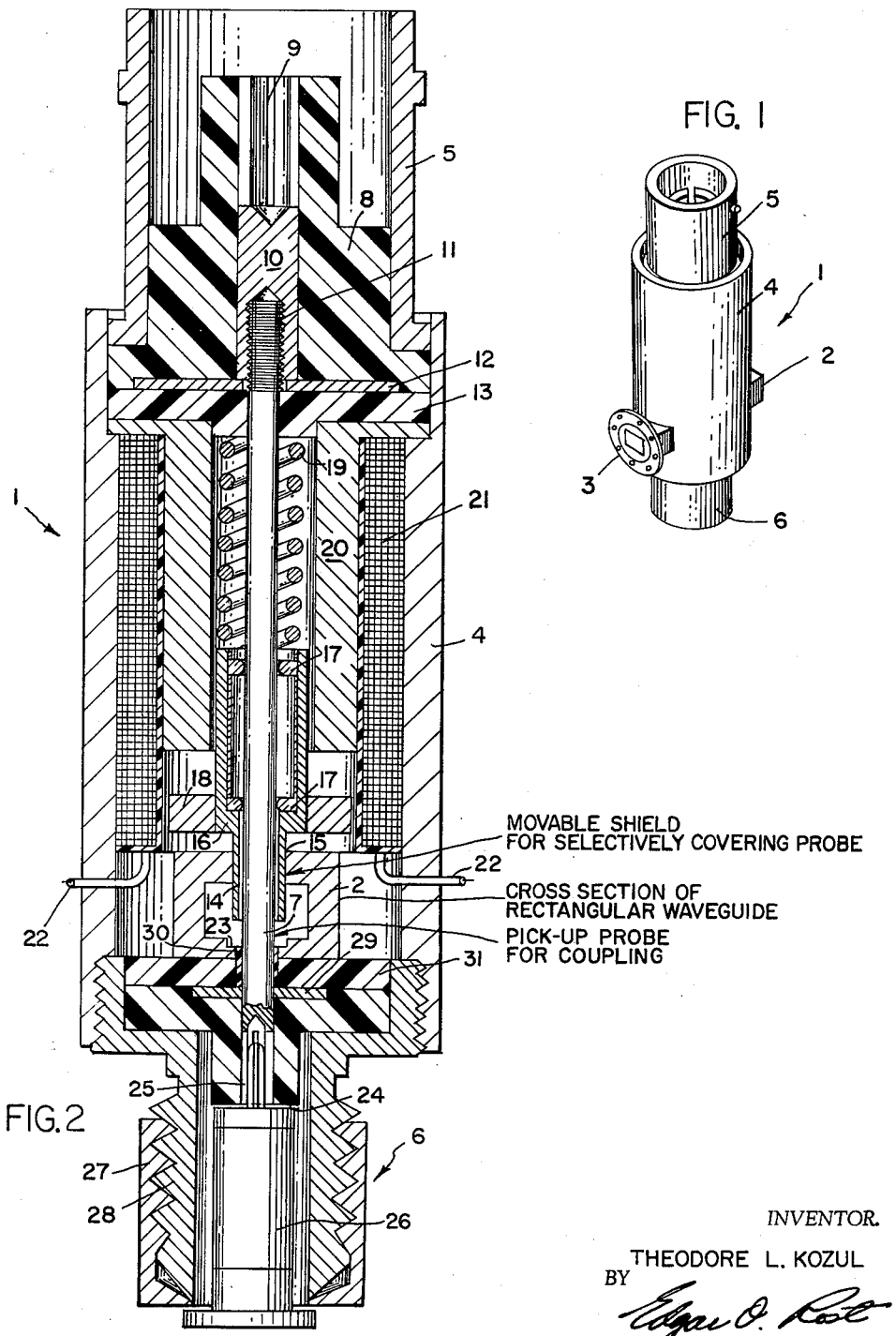

' # United States Patent Office 3,092,781
Patented June 4, 1963

3,092,781
PROTECTIVE DEVICE FOR RADAR RECEIVING APPARATUS INCLUDING CRYSTAL DIODE DETECTOR MEANS
Theodore L. Kozul, 19 Wright Ave., Medford, Mass.
Filed Aug. 10, 1961, Ser. No. 130,680
10 Claims. (Cl. 329—162)

The present invention relates generally to microwave energy transmission control apparatus for radar systems and, more particularly, to a new and improved device incorporating means for the potection of a sensitive receiving apparatus during such periods when the radar system is inoperative and adjacent systems may be radiating high power energy capable of damaging such apparatus.

In the microwave art, radar systems commonly employ a single antenna for transmission of high power energy signals as well as reception of low power echo pulses. A common device employed for the protection of the sensitive receiving apparatus is the so-called transmit-receive (TR) gaseous discharge switch. While the system is operative an intense gaseous discharge initiated by a keep-alive voltage source will effectively prevent passage of energy capable of damaging the crystal diode detector in the receiving apparatus. In the inoperative or standby condition of the system the TR tube does not ionize because of the absence of the keep-alive voltage and as a result any radio frequency energy radiated from antennas of adjacent radar systems may cause accidental damage or deterioration to the crystal diode detector.

Numerous devices for the protection of the crystal diode detector by means of attenuating such spurious radiated energy include mechanical shutter devices mounted within the TR tube or within the waveguide structure preceding the receiving apparatus. The configuration of such protective devices include metallic vanes or plunger rods adapted to be rapidly inserted and removed from the waveguide interior. Such mechanical structures generally entail the usage of numerous movable components and are subject to wear or frequent mechanical failures to render them ineffective.

The present invention, therefore, has for its primary object the provision of a new and improved protective device for microwave crystal diode detectors.

A further object of the invention is the provision of a protective device for microwave crystal diode detectors which eliminates the need for providing secondary waveguide shutters or attenuators in a radar system.

A still further object of the invention is the provision of a protective device for microwave crystal diode detectors incorporating means for the prevention of crystal damage while the radar system is inoperative entirely within the crystal mount apparatus.

Another object of the present invention is the provision of a protective device for microwave crystal diode detectors wherein the number of moveable parts is reduced to a minimum and the overall structure avoids the disadvantages inherent in prior art waveguide shutter devices.

These and other objects which will become apparent as the description of the invention unfolds are attained in the manner described in the following brief summary of the principal features of the invention.

While prior art protective devices entail the use of separate metallic vanes or flaps, collectively referred to as shutters, mounted in the waveguide system between the crystal diode detector apparatus and the TR tube or shorting mechanisms within the TR itself, the present invention takes the form of metallic shielding means incorporated within the crystal diode detector mount apparatus in all such radar systems. Such crystal mounts provide a pickup probe traversing the cross-sectional area of a section of waveguide which forms an extension of the center conductor of a coaxial line leading to the I-F amplifier and accompanying receiving apparatus. A crystal diode detector of the coaxial cartridge type is commonly inserted in contact with the pickup probe. In a preferred embodiment of the invention, the shielding means is electromechanically controlled and is slideable interiorly of the waveguide about the probe so that no signal energy is capable of being received by the probe to thereby damage the crystal diode detector. When it is desired for signal energy to be coupled to the detector, the shielding means may be rapidly retracted from the waveguide interior. In this manner a protective device for the crystal diode detector and a mount for same is incorporated in a single unitary structure. Moveable vanes adapted to enclose the entire waveguide cross-sectional area or plunger rods adapted to contact the resonant gap structure within the TR are thereby eliminated and a simple, efficient and reliable device is provided.

Other objects, features and advantages of the present invention will be evident after consideration of the following detailed description of an illustrative embodiment and the accompanying drawings, wherein:

FIG. 1 is a perspective view of the embodiment of the invention;

FIG. 2 is an enlarged vertical cross-sectional view of the embodiment;

Figure 3:
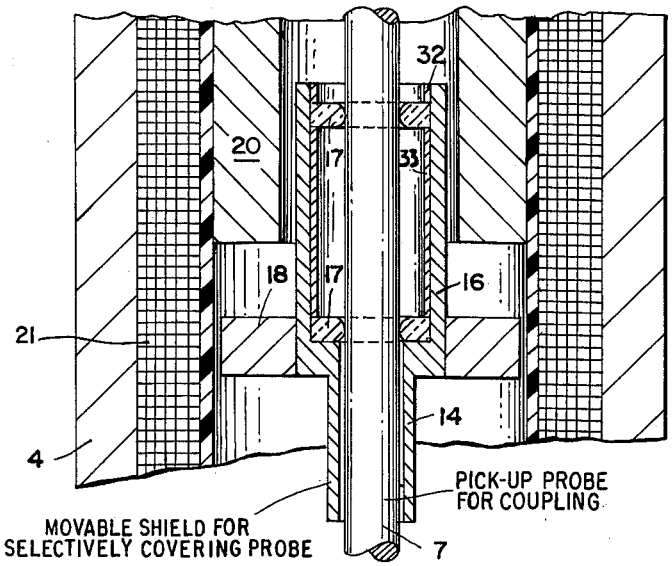
FIG. 3 is an enlarged fragmentary view showing the moveable member of the illustrative embodiment.

Referring to the drawings, FIG. 1 illustrates the overall structure of the embodiment 1 having a rectangular waveguide section 2 closed at one end with mounting flange 3 at the opposite end, extending transversely to the axis of the main cylindrical body section 4.

Turning now to FIG. 2 the electrically conductive pickup probe 7 is disposed transversely to the axis of waveguide 2 and terminates at one end in a pronged receptacle 9 centrally disposed within an insulator 8 of a dielectric material such as Teflon. An intermediate metallic section 10 is provided with a threaded reentrant portion 11 to receive and retain the pickup probe 7. A metallic washer 12 secured to the pickup probe is positioned within a recessed portion of insulator 8 and a washer 13 of a similar insulating material abuts washer 12. The aforementioned components together with an outer metallic sleeve member form the connector 5 to couple the received electrical energy to the I-F amplifier of the receiving apparatus.

In accordance with the teachings of the present invention, I provide a hollow metallic cylindrical shield 14 extending into the waveguide interior through an aperture 15 in the top wall of waveguide section 2. The shield completely surrounds pickup probe 7 and is slideably disposed with respect to the waveguide interior by means of a bearing member 16 having a plurality of bearings 17 of an insulating material such as sapphire in contacting relationship with the lateral surfaces of pickup probe 7. The shield may be activated by means of an armature 18 of a magnetic material secured to bearing member 16. Spring 19 bears against the upper part of bearing member 16 and washer 13 to thereby urge the shield in the downward or closed position.

The armature 18 will be attracted by electromechanical means comprising a core 20 of a magnetic material having a plurality of coils of a conductive wire 21 thereabout with connecting leads 22 to a suitable A.C. or D.C. voltage source.

Figure 4:
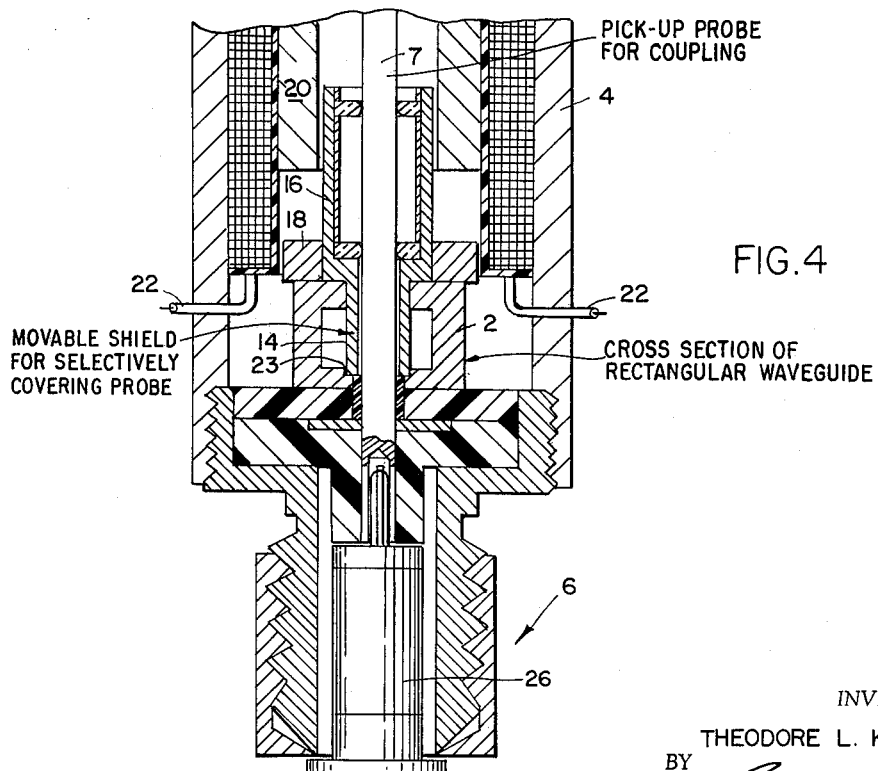
FIG. 4 is a fragmentary cross-sectional view illustrating the protective mechanism in the closed position when the radar system is inoperative.

In the downward or closed position with the shield 14 completely disposed within the waveguide interior a step 23 in the opposing broad wall of the waveguide will be contacted. This position will be clearly shown in FIG. 4 and results in the complete short circuiting of any energy entering the waveguide section.

Pickup probe 7 has disposed at its opposite end a receptacle 25 and a metallic washer 29 soldered thereto. A hollow sleeve member 30 of an insulating material, as well as, insulators 24 and 31 abut washer 29 to thereby retain the pickup probe in a fixed position. Insulators 8, 13, 24 and 31, as well as sleeve 30, serve to electrically isolate the probe from the walls of waveguide 2.

Any suitable cartridge type crystal diode detector may be plugged into the receptacle 25 and may be maintained in this position by the structure provided by the holder 6. Such structure includes a threaded shank portion 28 and retaining nut 27 internally threaded to thereby securely clamp against the outer wall of the crystal detector. Since the invention is adaptable to all microwave frequencies, the crystal diode detectors employed will vary and are, therefore, shown generally as at 26. A feature of the invention exists in that the internal areas including the waveguide section may be pressurized and crystal diode detectors may be replaced in the mount structure shown without deterioration of the pressurized condition.

Referring now to FIG. 3 the internal structure of the bearing member 16 will be revealed. As shown the jeweled bearings 17 are retained in their relative position by means of spacers 32 and 33. The use of such bearing surfaces to contact the metallic probe surfaces will result in extremely long life and relatively failure-proof operation.

Preferably, the shield 14 may be fabricated of a high conductivity material such as beryllium copper. In addition this protective mechanism lends itself to very easy adaptation to all sizes of waveguide as well as other configurations such as ridged guide for C band. Illustrative of this feature is the fact that the probe dimensions at microwave frequencies is substantially uniform at approximately .046 inch. Hence in the illustrative embodiment designed for $K_a$ band wherein the guide dimensions are .220 inch by .360 inch the overall diameter of the main cylindrical body 4 will be only approximately one-half inch. Since the actuating mechanism as well as the protective shield will remain essentially the same for all frequencies it would be a simple matter to design similar devices useful to as high as N band (90–140 megacycles) or as low as L band (1000 megacycles) simply by altering the waveguide dimensions. In larger size guides the parameters of the actuating mechanism remain fixed and the guide walls would extend beyond rather than be enclosed as shown in the illustrative embodiment.

Further, in such radar system receiving apparatus utilizing a plurality of crystal diode detectors it is a simple matter to incorporate plural protective mechanisms.

Additionally, the device disclosed is capable of operation under all environmental conditions as well as shock and vibration to which radar systems may be subjected. The Teflon insulators disposed at opposite ends of the probe or any other satisfactory sealable dielectric material may be sealed to adjacent metallic surfaces such as cylinder 4 to facilitate pressurizing of the waveguide system together with maintaining the device free from contaminants in the atmosphere as well as moisture.

There is thus disclosed in accordance with the practice of this invention, a highly efficient protective device for microwave crystal diode detectors which facilitates such protection wherever a crystal diode detector is used in a radar system. Prior art structures cannot be utilized in the higher orders of frequencies wherein the guide dimensions are extremely small. The elimination of secondary mechanical structures within the radar system or TR tube further enhances the electrical parameters in that the insertion loss is negligible. Structurally the device reduces the number of moveable components to thereby enhance operational life through the reduction of mechanical failures which plague multiple component embodiments.

While an embodiment of the invention has been specifically described herein, it is intended that all matter be interpreted in accordance with the spirit and scope of the invention as defined in the appended claims.

What is claimed is:

1. A protective device for a radar system receiving apparatus comprising waveguide means for mounting a mircowave frequency crystal diode detector, metallic probe means extending transversely to the axis of said waveguide means, metallic shielding means adapted to be translated interiorly of said waveguide means to encompass all lateral surfaces of said probe means exposed therein and electromechanical means adapted for the rapid removal of said shielding means from the waveguide interior.

2. A protective device for a radar system receiving apparatus comprising waveguide means for mounting a microwave frequency crystal diode detector exteriorly thereof, metallic probe means extending transversely to the longitudinal axis of said waveguide means and having one end thereof in contact with said crystal diode detector, metallic shielding means adapted to be translated interiorly of said waveguide means to encompass all lateral surfaces of said probe means exposed therein and electromechanical means intermediately disposed between the ends of said probe means to rapidly remove said shielding means from the waveguide interior.

3. A protective device for a radar system receiving apparatus comprising waveguide means for mounting a microwave frequency crystal diode detector of the coaxial cartridge type exteriorly thereof, metallic probe means extending transversely to the horizontal axis of said waveguide means and having one end in contact with the center conductor of said crystal diode to form an extension thereof, moveable metallic cylindrical shielding means adapted to be translated interiorly of said waveguide means to enclose all lateral surfaces of said probe means exposed therein, said shield contacting opposing broad walls of said waveguide means to thereby provide a metallic short circuit therebetween and electromechanical means intermediately disposed between the ends of said probe means to rapidly remove said shield from the waveguide interior.

4. A protective device for a radar system receiving apparatus according to claim 3 wherein opposing ends of said probe means are secured by members of a dielectric insulating material.

5. A protective device for a radar system receiving apparatus according to claim 3 wherein said waveguide means are wholly contained within the overall cross-sectional area of the device.

6. A protective device for a radar system receiving apparatus according to claim 3 wherein said shielding means include a bearing member having internal bearings contacting the lateral surfaces of said probe means exteriorly disposed of said waveguide means and a permanent magnetic armature affixed to said bearing member.

7. A microwave energy detector for radar system receiving apparatus comprising a section of waveguide having a mounting flange at one end thereof, an electrically conductive wire probe extending transversely to the axis of said waveguide, a crystal diode mounted exteriorly of said waveguide and contacting one end of said probe, a connector for a coaxial conductor to the receiving apparatus terminating the opposite end of said probe, an intermediately disposed cylindrical shield encircling a portion of said probe and adapted to be selectively translated into and retracted from the interior of said waveguide, and electromechanical means mounted adjacent to said waveguide to actuate said shield.

8. A microwave energy detector for radar system receiving apparatus comprising a section of waveguide closed at one end and having a mounting flange at the opposite end, an electrically conductive wire probe extending transversely to the axis of said waveguide, a cartridge type crystal diode terminating one end of said probe exteriorly of said waveguide, a connector for a coaxial conductor to the receiving apparatus terminating the opposite end of said probe, said probe being electrically isolated from said waveguide, an intermediately disposed cylindrical metallic shield encircling a portion of said probe and adapted to be selectively translated into and retracted from the interior of said waveguide, a bearing member including bearings of an insulating material contacting the lateral surface of said probe joined to said shield and a permanent magnetic armature affixed to said bearing member, and electromechanical means mounted adjacent to said waveguide to attract said armature to thereby actuate said shield.

9. A microwave energy detector for radar system receiving apparatus according to claim 8 wherein said waveguide is wholly contained within the overall cross-sectional area of said electromechanical means.

10. A microwave energy detector for radar receiving apparatus according to claim 8 wherein said bearing member is urged downward by compressible means with said shield being disposed within the interior of said waveguide to thereby prevent conduction of microwave energy by said probe.

References Cited in the file of this patent
UNITED STATES PATENTS
2,999,153   Neumann _____ Sept. 5, 1961